Dec. 17, 1968     F. J. BOWES     3,416,858
TEMPLE
Filed March 10, 1965
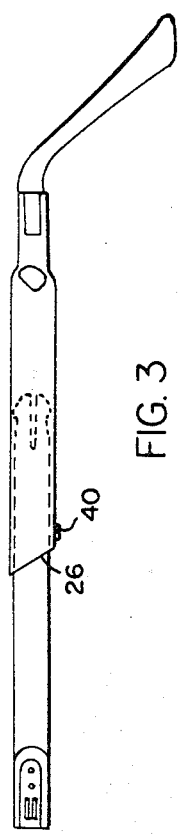
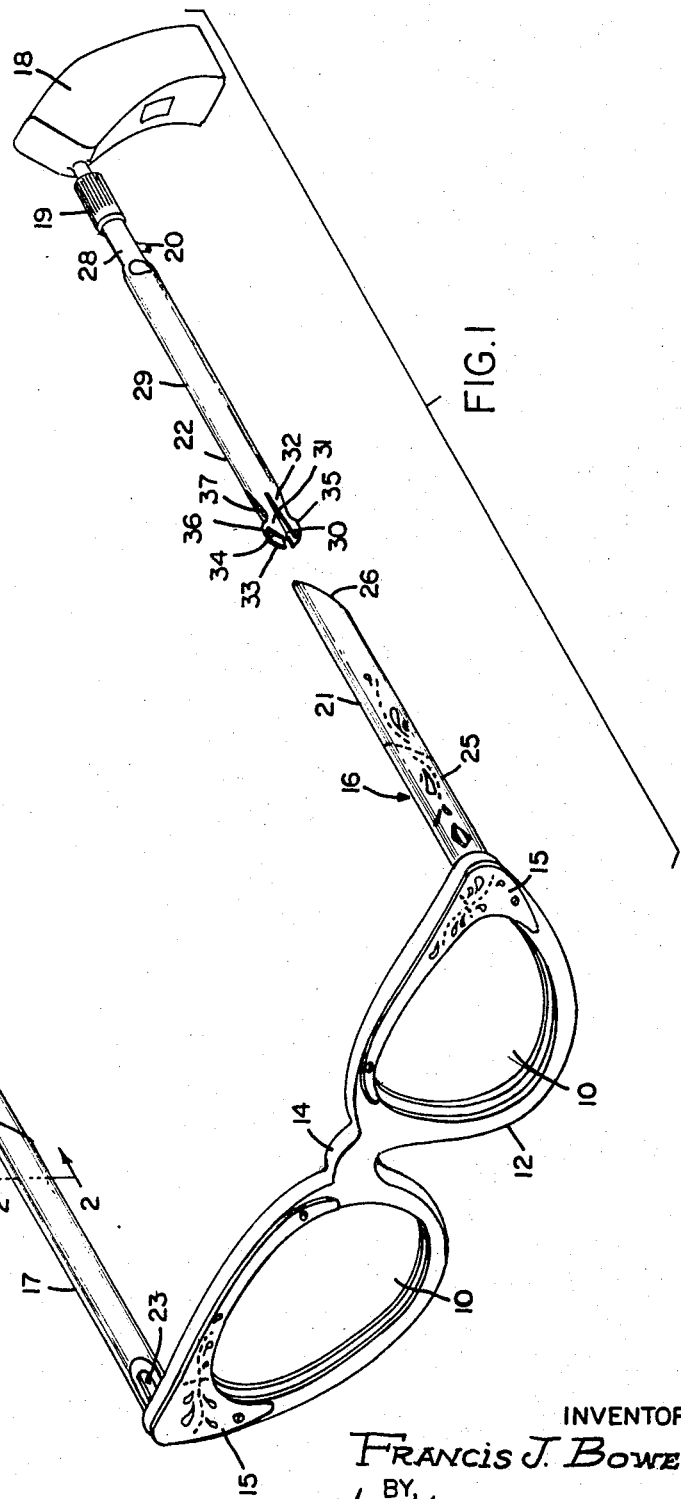
INVENTOR
*Francis J. Bowes*
BY,
*Wolf, Greenfield & Hieken*
ATTORNEYS

United States Patent Office

3,416,858
Patented Dec. 17, 1968

3,416,858
TEMPLE
Francis J. Bowes, Winchester, Mass., assignor to Non-Slip Temple Company, Inc., Holliston, Mass., a corporation of Massachusetts
Continuation-in-part of application Ser. No. 149,261, Nov. 1, 1961. This application Mar. 10, 1965, Ser. No. 438,601
7 Claims. (Cl. 351—118)

ABSTRACT OF THE DISCLOSURE

An eyeglass temple comprising front and rear sections joined together is provided with one of the sections having a wall defining an axially extending recess. A second section comprises an elongated metallic slide constructed and arranged to be snugly received and slide within the recess. The slide has a slit extending longitudinally thereof dividing the slide into upper and lower spring-like portions each of which carry detents for biting into portions of the recess wall to retain the sections together in a fixed position upon reciprocal sliding of the slide therein.

Related application

This application is a continuation-in-part of earlier filed co-pending United States patent application Ser. No. 149,261, filed Nov. 1, 1961 and now abandoned.

This invention relates to the temples of eyeglass frames and has application both to eyeglasses in general as well as to specialized forms of glasses, such as hearing-aid-glasses. In the fitting of eyeglasses, it is generally the practice to select a particular pair of temples of fixed length determined by the fitter with the aid of some measuring instrument. The fitter ordinarily stocks temples of ten or more different lengths and selects those of the appropriate size. The fine adjustments are thereafter made by bending the rear part of the temple which fits over or about the ears. It is obviously necessary to periodically change the temples, if not the entire eyeglass frame, of youngsters' glasses, as they outgrow the size to which they have been fitted.

In the case of hearing-aid-glasses, it is necessary that the rear portion of the temple carrying the hearing aid fit very precisely about the ear, and it is therefore very important that the temple length be carefully fitted to the individual wearer. Because of the very precise fit required, it has become common practice to make the temples for hearing-aid-glasses in two major sections, one section commonly termed the foretemple being hingedly secured to the lens frame and the other commonly termed the rear temple being secured in a fixed relationship to the foretemple and carrying at its rearward end the hearing aid. The rearward end of the read temple may be fitted with receiver parts communicating with the hearing aid as required.

Several problems arise out of the practice of fitting hearing-aid-glasses as described. First, it is necessary for the fitter to stock a substantial inventory of different sizes of foretemples so that a combination of foretemple and reartemple can be made of any length required. Secondly, once the temples have been assembled by the selection of a particular foretemple, no major changes may be made in the temple size without actually changing a part of the temple. Furthermore, because the foretemple and rear temple are permanently secured together once the combination of the two has been selected, the owner cannot readily change the hearing aid to another pair of glasses without performing several mechanical operations such as disconnecting the hinges and joining the temple with the lens frame.

The fitting of hearing-aid-glasses is also a lengthy procedure as the fitter must make a very careful determination of the foretemple lens with the aid of a dummy or measuring frame. Once having made a determination of the foretemple length, he then must connect it to the lens frame and permanently join the rear temple section to it. If the glasses are not then comfortable to the wearer, the fitter may be required to remove the foretemple and use another of different size to suit the wearer's wishes.

Several attempts have been made to construct variable lengths for temples. However, the problems involved in producing a variable or adjustable length temple are considerable. It is important that the adjustment be easily made and yet provide for positive prevention of movement of parts of the temple with respect to each other. It is also important that such temple constructions be relatively easily adjustable and relatively inexpensive while still presenting an attractive appearance.

It is an important object of this invention to provide eyeglass temples of adjustable lengths.

Another important object of this invention is to provide adjustable eyeglass temples that can be fitted with hearing aids.

Still another important object of this invention is to provide eyeglass temples of adjustable length which have an attractive appearance and are easily adjustable with parts of the temple being rigid with respect to each other.

To accomplish these and other objects, this invention includes among its important features an eyeglass temple made up of a foretemple and a separate rear temple. The two sections of the temple are adjustably connected together by means of an elongated recess preferably having an oval cross-section formed in one section, and an elongated slide carried by the other. The elongated slide is perferably split so as to be divided into two spring-like arms that fit into and bear against opposing portions of the elongated recess. The arms of the slide contact the opposing portions of the recess over a substantial length and the arms are biased to bear against the recess with an appreciable frictional grip. The arms carry means for biting into wall portions of the recess to aid in maintaining the two sections of the temple in proper desired relationship. Preferably the temple section carrying the recess has an angularly offset opening to permit ease of entrance of the slide to the recess.

These and other objects and features of this invention, along with its incident advantages, will be better understood and appreciated from the following detailed description of a few embodiments thereof, selected for purposes of illustration and shown in the accompanying drawing, in which:

FIG. 1 is a perspective partially exploded view of a pair of eyeglasses embodying this invention;

FIG. 2 is a cross-sectional view of a temple member thereof taken through line 2—2 of FIG. 1; and, FIG. 3 is a side view of an alternate embodiment of a temple constructed in accordance with this invention.

The eyeglasses shown in FIG. 1 include conventional lenses 10 enclosed in a frame 12 having a bridge 14, decorative plates 15, and bows or temples 16 and 17. This invention is confined to the construction of the bows or temples. In FIG. 1 temple 16 is shown with a conventional hearing aid 18 threadably connected to the rear end thereof by a screw lock nut 19 and having a conventional receiver pipe 20 depending downwardly from the hollow rear portion. In order to simplify the specification, only temple 16 will be fully described. However, it should be understood that the temples of this invention may have hearing aids at their ends or conventional ear pieces as shown in temple 17.

The embodiment of the temple shown in FIG. 1 includes a foretemple 21 and a rear temple 22. The foretemple 21 carries at its forward end a flat portion for positioning a hinge plate 23 of a conventional hinge adapted to mate with a similar hinge member (not shown) on the rear of the lens frame 12 to secure the foretemple to the lens frame. The foretemple is preferably formed from a tube which is flattened into a generally oval shape as seen in FIG. 2. Since there is no opening to the elongated recess 24 defined by the tube of the foretemple 21, dirt, dust and other fine matter cannot enter. Moreover, the flattened tubular shape closely simulates known temple shapes and is pleasing to the eye. The aesthetic appearance of the temple can be enhanced by the use of decorative means such as engravings 25 shown in FIG. 1.

The rear end of the foretemple is cut defining an end 26 which is non-perpendicular to the axis of the tubular foretemple 21. The advantages of the angular end 26 will be more fully discussed hereinafter.

Preferably the foretemple 21 or tubular member of the temple is formed of a thin metallic tube which is partially flattened. Aluminum is particularly suitable although other metals may be used. In some cases the tubular member 21 can be formed of plastic such as impact polystyrene.

The rear temple 22 having a rear ear piece 27 or hearing-aid attachment 18 is preferably formed from a thin gauge metallic tube similar to the material for temple 21 or having a hardness value slightly greater than that of the foretemple. The rear temple 22 has a rear portion 28 having a circular cross-section with a forward portion 29 having a flattened or oval cross-section with an outer circumference just slightly less than the inner circumference of the recess 24. Thus, portion 29 snugly and slideably fits within the recess 24 of the foretemple 21.

At the forward end of portion 29 is a longitudinal slit 30 along a substantial portion of the length thereof to divide the slide portion 29 into a pair of arms 31 and 32. The slit 30 provides resiliency in the slide by permitting the arms 31 and 32 to be compressed towards one another under a load. The end 33 of the slide is preferably rounded to facilitate insertation of the slide into the recess 24 and is preferably provided with upper and lower biting detents 34 and 35. The detents 34 and 35 have flat outer portions 36 with sharp angled surfaces 37 meeting therewith on one side and the rounded point 33 meeting therewith on another side.

In use, the arms 34 and 35 are preferably biased and spread apart so that flat surfaces 35 and 36 extend beyond the upper and lower surfaces of the slide 29. Thus when the slide 29 is inserted into the tubular foretemple 21 as shown in FIG. 1, the arms are resiliently compressed and are biased against the upper and lower wall portions of the recess formed in the tubular foretemple 21. This frictional fit tends to positively position the temple sections together.

Surprisingly, when a rear temple is constructed with detents and arms as above described and inserted into the tubular recess 24, reciprocal sliding of the rear temple within the tubular recess will cause buildup of forces positively positioning the tempe sections together. Thus, if the rear temple is slid into the foretemple and moved back and forth two or three times, it is found that the rear temple is substantially locked in position with respect to the foretemple 21. It is believed that this is due to an abrading action of the detents 34 and 35 which roughen opposing wall portions of the recess and increase the frictional engagement of the sections.

It should be noted that the angularly offset end 26 is important to allow ease of entrance of the arms and slide 29 into tubular recess 24. If this member is merely cut at a right angle to its axis, and the arms are spread apart slightly, there is difficulty in joining the rear temple to the foretemple. Because of the fact that an opening edge having dimensions greater than the outermost cross-section of the rear temple is provided by the angular cut, the rear temple can be easily inserted into the foretemple.

In the alternate embodiment of the invention shown at FIG. 3, the tubular portion of the temple is formed at the rear section while the resilient arm and slide portion comprises the foretemple section. This reversal of parts is entirely within the scope of this invention. In addition, in the embodiment of FIG. 3 a set screw 40 is provided adjacent to the lower edge of the opening 26. The set screw may be loosened to allow entrance of the slide 29 and tightened after the slide is in place to provide additional positive locking of the slide within the tubular recess 24. This expedient need not be employed since the normal locking action of the detent means is sufficient for normal usage of the temples. The set screw does have the additional advantage of preventing accidental separation of the temple sections since, upon withdrawal of the slide, detent 35 will catch on the set screw positively preventing complete separation of the sections.

While specific embodiments of this invention have been shown and described, many variations thereof are possible. For example, while it is preferred to use hollow tubular members, in some cases the slide section may be formed of a solid material. The particular detent means may vary so long as it provides proper biting action for frictional engagement. In all cases, the recess providing section has a continuous cross-section and the slide member preferably has an outer surface adopted to be snugly received within the tubular recess as shown in FIG. 2. Therefore, this invention is to be limited only by the spirit and scope of the appended claims.

What is claimed is:

1. An eyeglass temple comprising front and rear sections joined together,
   one of said sections having a wall defining an axially extending recess having a continuous encircling cross section,
   a second of said sections comprising an elongated metallic slide constructed and arranged to be snugly received and slide within said recess,
   said slide having a slit extending longitudinally thereof dividing the slide into upper and lower springlike portions,
   said slide defining a rounded forward portion dimensioned to enter said opening to cause said springlike portions to be resiliently sprung toward each other,
   said springlike portions carrying detents for biting into surface portions of said recess wall to retain said sections together upon reciprocal sliding of said slide therein.

2. An eyeglass temple in accordance with claim 1 wherein said sections are tubular in cross section and said second section is composed of a metal having a hardness value greater than the hardness value of said one section.

3. An eyeglass temple in accordance with claim 2 wherein said sections have oval cross sections and are constructed of aluminum.

4. An eyeglass temple in accordance with claim 1 wherein said one section comprises a front end for attachment to an eyeglass frame and a rear end defining an opening of said recess,
   said opening being angularly offset from the axis of said one section to permit ease of entrance of said slide into said recess.

5. An adjustable eyeglass temple comprising a front section and a rear section,
   said front section comprising a metallic tube defining an axially extending oval cross section channel having an opening lying in a plane angularly offset from the axis of said channel,
   said rear section comprising an elongated slide constructed and arranged to be snugly and slidably received within said channel,
   said slide having a rounded curved forward end and a slit extending longitudinally of said slide from said forward end to divide it into upper and lower springlike portions, said curved forward end being dimensioned to be received in said front section opening so that axial movement of said front and rear sections toward each other causes initial movement of said springlike portions toward each other whereby said springlike portions are resiliently biased against said channel, said springlike portions carrying detents for biting into said front section in said recess surface upon reciprocal sliding of said slide therein.

6. An eyeglass temple in accordance with claim 5 and further comprising locking means carried by said one section for locking said sections together.

7. An eyeglass temple in accordance with claim 3 and further comprising said second section carrying a means for engagement of a rear end of said second section with an auxiliary attachment.

References Cited

UNITED STATES PATENTS

| 1,138,012 | 5/1915 | Perkins | 287—117 |
| 2,341,233 | 2/1944 | Norton | 351—118 |
| 3,118,962 | 1/1964 | Hammond | 351—118 |

FOREIGN PATENTS 802,839  11/1958  Great Britain.

DAVID SCHONBERG, *Primary Examiner.*

M. J. TOKAR, *Assistant Examiner.*